Figure 1:
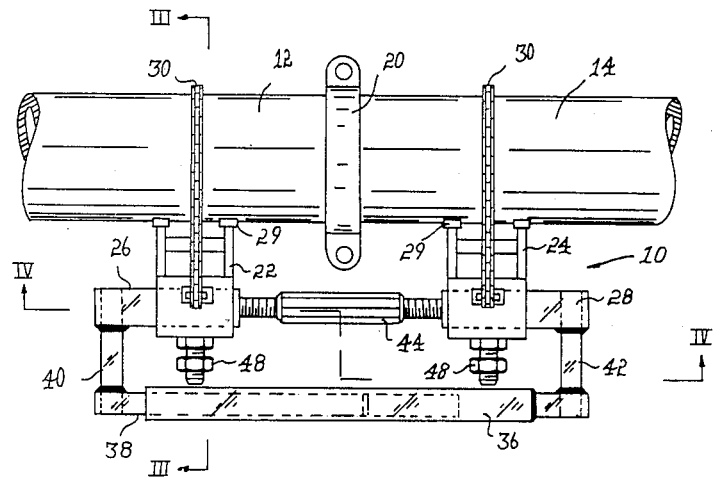

United States Patent [19]

Landman et al.

[11] Patent Number: 4,769,889
[45] Date of Patent: Sep. 13, 1988

[54] APPARATUS FOR REPLACING PIPE GASKETS

[75] Inventors: Michael J. Landman, P.O. Box 839, Odendaalsrus, Orange Free State, South Africa, 9480; Jurgens J. Landman, Odendaalsrus, South Africa

[73] Assignee: Michael J. Landman, Odendaalsrus, South Africa

[21] Appl. No.: 919,185

[22] Filed: Oct. 15, 1986

[30] Foreign Application Priority Data

Oct. 16, 1985 [ZA] South Africa .................. 85/7947

[51] Int. Cl.⁴ ............................................. B23P 19/04
[52] U.S. Cl. ........................................ 29/237; 269/43; 285/18
[58] Field of Search .............. 285/18, 21; 29/237, 29/426.5, 272; 403/44; 269/43, 130, 131, 132; 228/49.3

[56] References Cited

U.S. PATENT DOCUMENTS

| | | |
|---|---|---|
| 2,514,374 | 7/1950 | Cooper .............................. 29/237 X |
| 3,364,555 | 1/1968 | Swink .................................. 29/237 |
| 3,722,038 | 3/1973 | Arntz et al. ...................... 285/21 X |
| 3,727,289 | 4/1973 | Bemelmann et al. ............. 285/21 X |
| 4,054,984 | 10/1977 | Ball et al. ......................... 269/43 X |
| 4,295,257 | 10/1981 | Strohs .............................. 269/43 X |
| 4,418,458 | 12/1983 | Hunter ................................ 29/237 |
| 4,545,569 | 10/1985 | Schroder et al. ................... 269/43 |

Primary Examiner—Thomas F. Callaghan
Attorney, Agent, or Firm—Ladas & Parry

[57] ABSTRACT

The invention provides apparatus for displacing the juxtaposed ends of pipes towards or away from one another comprising; apparatus for separating and drawing together the juxtaposed ends of pipes comprising; a first gripping member engageable with a first pipe; a second gripping member engageable with a second pipe; a first and second clamping means for clamping the first and second pipes to the first and second gripping members respectively; a guide means for permitting movement of the gripping members towards and away from one another in a guided manner; and a displacing means for displacing the gripping members towards and away from one another.

6 Claims, 2 Drawing Sheets

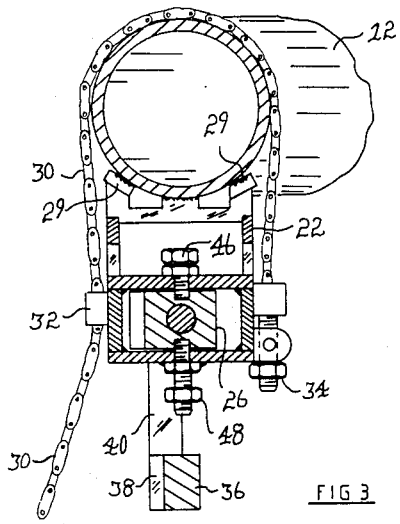
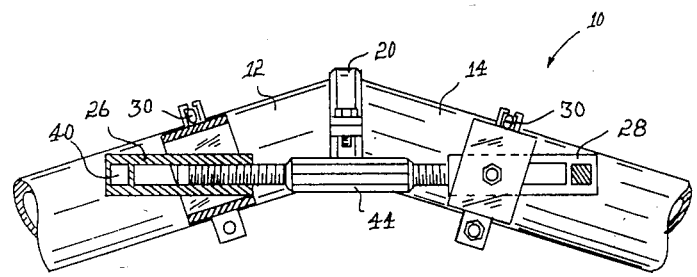

1

APPARATUS FOR REPLACING PIPE GASKETS

BACKGROUND OF THE INVENTION

This invention relates to an apparatus for separating pipe flanges for example for purposes of replacing a gasket. The apparatus is particularly suitable for use with pipes that have end flanges which may be coupled together by means of nuts and bolts, a clamping collar or the like. Where long lengths of pipeline are encountered it is often problematical to separate pipe flanges and it is an object of the invention to provide apparatus which will facilitate the separation and drawing together of pipe flanges.

SUMMARY OF THE INVENTION

According to the invention there is provided an apparatus for displacing the juxtaposed ends of pipes towards or away from one another including:
 a first gripping member engageable with a first pipe;
 a second gripping member engageable with a second pipe;
 a first and second clamping means for clamping the first and second pipes to the first and second gripping members respectively;
 a guide means for permitting movement of the gripping members towards and away from one another in a guided manner; and
 a displacing means for displacing the gripping members together and away from one another.

Conveniently the guide means may be such that the gripping members are linearly displaceable towards and away from one another. Preferably, the guide means will operate telescopically. In one form it may comprise a telescoping piston and cylinder arrangement, one gripping member being coupled to the piston and the other gripping member being coupled to the cylinder.

As the pipes are not necessarily aligned, and are often at an angle to one another, the gripping members may be pivotally mounted on mounting members and there may also be a locking means for locking the gripping members at selected angles on the mounting members.

In a preferred form the displacing means may comprise a turn buckle, the turn buckle being coupled to either the gripping members or the mounting members.

DESCRIPTION OF INVENTION

Figure 2:
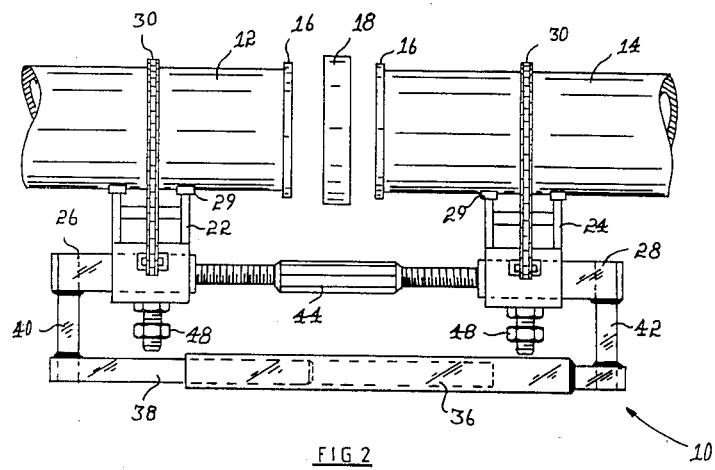

The invention is now described, by way of an example, with reference to the accompanying drawings, in which:

FIG. 1 is an elevation of a gasket replacing apparatus in accordance with the invention engaged with two pipes that are coupled together, FIG. 2 is an elevation of the apparatus and the pipes in FIG. 1 with the pipes separated, FIG. 3 is a section on line III—III in FIG. 1; and FIG. 4 is a view from below of the apparatus in FIG. 1, partly sectioned, on line IV—IV in FIG. 1.

Referring to the drawings, an apparatus for replacing a gasket between two pipes is designated generally by reference numeral 10, the pipes being designated by numerals 12 and 14. The pipes 12 and 14 have end flanges 16 between which a gasket 18 is located. The pipes 12 and 14 are coupled together by means of a a two-part clamping ring 20.

The apparatus 10 has a first jaw-block 22 and a second jaw-block that are pivotally mounted on arms 26 and 28 respectively. The jaw-blocks 22 and 24 have serrated gripping surfaces 29 which are curved so as to grip the pipes 12 and 14 better. The jaw-blocks 22 and 24 have clamping chains 30 by means of which the pipes 12 and 14 may be clamped against the surfaces 29. The jaw-blocks 22 and 24 carry chain locks 32 with which the chains 30 may be engaged and disengaged, and tightening nut and bolt arrangements 34. The arms 26 and 28 are fast with a slide arrangement formed by a hollow tube 36 and a rod 38 that slides within the tube 36. Thus, the arm 26 is secured to the rod 38 by means of a bar 40, to be spaced therefrom, and the arm 28 is similarly secured to the tube 36 by means of a bar 42. The arms 26 and 28 are internally screw-threaded and are engaged with a turn buckle 44 by means of which the arms 26 and 28 are displaced towards and away from one another, their motion being guided by the tube and rod 36, 38. The jaw-blocks 22 and 24 are pivotally mounted on the arms 26 and 28, being held in position by an upper bolt 46 with a further lower bolt 48 being provided to lock the jaw-blocks 22, 24 in any particular angular position.

In use, the turn buckle 44 is rotated to bring the jaw-blocks 22 and 24 towards one another until they are a suitable distance apart, the chains 30 are disengaged form the jaw-blocks 22 and 24 and the surfaces 29 are brought into engagement with the pipes 12 and 14. Normally, the pipes 12 and 14 are elavated and accordingly the apparatus 10 is located below the pipes 12 and 14 and can be held in position by a suitable prop or jack (not shown). The chains 30 are then engaged with the locks 32 and the chains 30 are tightened by means of the nut and bolt arrangements 34. Once the pipes 12 and 14 have been securely clamped the bolts 48 are tightened to lock the jaw-blocks 22 and 24 in the particular angular positions they have attained, which are determined by the angle between the pipes 12 and 14. The turn buckle 44 is then rotated to move the jaw-blocks 22 and 24 slightly towards one another thereby compressing the gasket 18. The collar 20 is removed and the turn buckle 44 is then rotated in the opposite direction to move the pipes 12 and 14 apart in a controlled manner. When they are sufficiently far apart the old gasket 18 is removed and a new gasket is inserted between the flanges 16. The turn buckle 44 is then again rotated in the appropriate direction to bring the pipes 12 and 14 together so that the collar 20 may be replaced. The chains 30 are then loosened and disengaged and the apparatus removed.

We claim:

1. Apparatus for separating and drawing together the juxtaposed ends of pipes comprising:
 a first gripping member engagable with a first pipe;
 a second gripping member engageable with a second pipe, said first and second gripping members being pivotally mounted on a first mounting member and a second mounting member, respectively;
 a first and second clamping means for clamping the first and second pipes to the first and second gripping members respectively;
 locking means for locking the gripping members at selected angles on said mounting members;
 a guide means for permitting movements of the gripping members towards and away from one another in a guided manner; and
 a displacing means for displacing the gripping members towards and away from one another.

2. Apparatus according to claim 1 wherein the guide means operate to cause the gripping members to be displaced towards and away from one another linearly.

3. Apparatus according to claim 2 wherein the guide means comprises a first telescoping member and a second telescoping member, the first telescoping member being coupled to the first gripping member and the second telescoping member being coupled to the second gripping member.

4. Apparatus according to claim 3 wherein the guide means comprises a telescoping piston and cylinder arrangement with one gripping member being coupled to the piston and the other gripping member being coupled to the cylinder.

5. Apparatus according to claim 1 wherein the displacing means comprises a turn buckle which engages the first and the second gripping members.

6. Apparatus according to claim 1 wherein the gripping members are pivotally mounted on mounting members and the displacing means comprises a turn buckle coupled such mounting members.

* * * * *